Sept. 28, 1937. D. SANTINI ET AL 2,094,377
CONTROL SYSTEM
Filed Aug. 31, 1935 3 Sheets—Sheet 1

WITNESSES:
C. J. Welles.
R. R. Lockwood

INVENTORS
Danilo Santini and
Kenneth M. White.
BY
ATTORNEY

Sept. 28, 1937.　　D. SANTINI ET AL　　2,094,377
CONTROL SYSTEM
Filed Aug. 31, 1935　　3 Sheets-Sheet 2

WITNESSES:
C. J. Weller.
R. R. Lockwood

INVENTORS
Danilo Santini and
Kenneth M. White.
BY
ATTORNEY

Sept. 28, 1937. D. SANTINI ET AL 2,094,377
CONTROL SYSTEM
Filed Aug. 31, 1935 3 Sheets-Sheet 3

INVENTORS
Danilo Santini and
Kenneth M. White.
BY
ATTORNEY

WITNESSES:

Patented Sept. 28, 1937

2,094,377

UNITED STATES PATENT OFFICE 2,094,377

CONTROL SYSTEM

Danilo Santini, Chicago, Ill., and Kenneth M. White, Tenafly, N. J., assignors to Westinghouse Electric Elevator Company, Chicago, Ill., a corporation of Illinois Application August 31, 1935, Serial No. 38,770

22 Claims. (Cl. 172—239)

Our invention relates, generally, to electric control systems. It has particular relation to control systems of the Ward-Leonard type and it constitutes an improvement over the control system disclosed in the copending application of White, one of the present joint inventors, Serial No. 38,771, filed August 31, 1935, and assigned to the assignee of this application.

Control systems of the Ward-Leonard type have many applications in which they are employed under widely varying conditions. In particular, when a system of this type is employed for controlling the operation of an elevator car a wide range of operating conditions is met. It is not only necessary to move the elevator car upwardly in the hatchway or shaft, but it is also necessary to permit it to move downwardly, both under widely varying load and other conditions.

In controlling the operation of an elevator car with a Ward-Leonard system, a motor is provided which is arranged to be mechanically connected to the elevator car by cables for moving the elevator car in both directions. Ordinarily, the motor is provided with a separately excited field winding and the desired direction of movement of the car is effected by reversing the polarity applied to its armature. The motor is arranged to be energized from a generator which may be provided with a series field winding to compensate for the IR drop in its armature circuit, in the armature circuit of the motor, and in the leads interconnecting the armatures. The generator is provided with a separately excited main field winding, the current through which is arranged to be controlled and reversed in order to operate the motor and the load attached thereto, for example the elevator car, at various speeds in either direction of travel. The excitation of the main field winding of the generator may be controlled by means of a rheostat or the combination of various resistors and suitable control devices for inserting various steps of resistance in circuit with the main field winding. For each step of the controller which alters the current flowing through the main field winding of the generator there is a particular speed of operation of the motor which is desired. Any departure in speed from this desired value introduces undesirable operating conditions in the functioning of the system.

If it were possible to maintain all of the conditions in a control system of the Ward-Leonard type absolutely constant, it would then be possible to obtain an exact relationship between the speed of the motor and the setting of the controller which regulates the flow of current through the main field winding of the generator. Due to the physical constants and characteristics of the system, however, it is not possible to achieve such a result without the use of a compensating system of some type. This is particularly true when the Ward-Leonard control system is employed to control the movement of an elevator car in a hatchway. In such case, additional variables enter into the functioning of the system which make it difficult to maintain the speed of the elevator car under all conditions at predetermined values corresponding to the various settings of the controller for the main field winding of the generator.

With regard to the elevator car itself, it operates under two extremes of conditions, that is, full load up and full load down. When the elevator car is operated with full load in the up direction, the motor has applied thereto maximum power from the generator. Under these conditions, it is necessary for the load to be lifted against the force of gravity. When the elevator car is operating in the down direction under full load, the functioning of the motor is reversed and it operates as a generator, causing the generator to function as a motor and to return power to the power source in the event that the generator is arranged to be driven by means of a motor such as an alternating-current motor. A further variable factor which enters into the functioning of the elevator car is the friction which it encounters in its movement along the hatchway. When the elevator car is first installed, this friction may be relatively great but it lessens in effect as the car is used over a period of time.

In the motor which is connected to drive the elevator car, various changes in its operating conditions occur which affect its speed for each setting of the controller for the main field winding of the generator. The resistance losses of the motor due to changes in temperature constitute one item of variation. These changes may be due, in part, to changes in temperature caused by changes in the weather, and, in part, by the loading of the motor. That is, in the winter when it is cold, the resistance losses of the motor will be somewhat less than they are in the summer. Likewise, when the system is initiated in operation after having been shut down for a period, the resistance losses are less than they are when the system has been operating and the motor has become heated to operating temperature. Also depending upon the load carried by the motor, it will reach different operating temperatures. A further variable in the operation of the motor is the change in resistance of its main field winding. Its resistance is changed in accordance with the temperature of the motor, and in accordance therewith, the current flowing therethrough is somewhat altered to change the point on the magnetization curve of the motor at which it operates.

There are many conditions which affect the functioning of the generator that is connected to supply current to the motor, thereby causing its power output to vary widely for the same setting of the controller for the main field winding under like conditions of load. Since it operates under widely varying conditions, these results are particularly accentuated. In order to reverse the direction of rotation of the motor, the current flowing through the main field winding of the generator is reversed. Depending upon the degree of reversal, there is a change in the residual magnetism of the main poles, which, to a certain extent, will alter the output of the generator for the same setting of the controller and load applied to the motor. Furthermore, the change in residual magnetism of the interpoles of the generator under these widely varying conditions also, to a certain extent, introduces another variable factor. The resistance of the main field winding of the generator varies with temperature. As a result, for the same setting of the controller, there may be different values of current flowing through it depending upon its temperature.

The condition of the commutator and brushes of the generator is another important variable factor which affects the operation of the generator. When the generator is first installed, or the commutator has been reground, the commutator is in a somewhat roughened condition, thereby causing the contact resistance between it and the brushes to vary. As the generator goes into operation, the commutator becomes polished and the contact resistance of the brushes correspondingly varies, although it may reach a substantially constant value after being in operation over a considerable period. Under certain conditions, the commutator becomes grooved or roughened, due to sand or other debris coming into contact with it and being carried underneath the brushes. When the system is subjected to heavy overloads, the brushholders tend to change their position due to the increase in temperature thereof caused by the overload. There is, then, a tendency for the brushes to be slightly shifted and as a result, a cumulative or differential compounding effect may be present, depending on the direction of shift, which introduces another variable factor. There is also some change in the contact drop across the faces of the brushes and through the brushes, due to current flow therethrough. This introduces still another variable factor.

In the circuit connecting the armatures of the motor and generator, it is necessary to introduce joints between the conductors. The contact resistance of these joints varies to some extent with the temperature caused by the weather and by the current flowing therethrough. As a result, there is some change in the resistance of the load circuit under these varying conditions.

Since all of the foregoing variable characteristics enter into the operation of a Ward-Leonard control system employed for operating an elevator car in a hatchway, it has been necessary in the past to make certain compromises in its functioning and to permit certain variations in the speed of the elevator car from the desired speeds. It has not been possible heretofore to operate the elevator car in the hatchway at speeds corresponding to the setting of the controller of the main field winding of the generator, regardless of the load and operating conditions of the system. As the system goes into service it has been necessary in the past to continually make various adjustments in order to compensate for factors which change from time to time. As a result, the maintenance expense has been considerable and it has been necessary to provide a control system which is adjustable over a comparatively wide range, in order to permit the necessary adjustments that were required to be made from time to time.

In order to operate the elevator car so that under all conditions its movement will be independent of all of the foregoing variable characteristics, it is desirable that the speed of the elevator car or the motor mechanically coupled thereto correspond precisely with the setting of the controller for the generator field winding. That is, regardless of these various factors which variably affect the functioning of the system, the speed of movement of the elevator car for each setting of the controller should be constant, regardless of the direction of movement of the elevator car, the load carried thereby, the temperature and operating condition of the motor and generator, and other variable factors.

In the copending application hereinbefore referred to, a regulator-generator is provided having series and shunt field windings which are arranged to be respectively responsive to the current and voltage which are applied to the motor of the Ward-Leonard control system. These field windings are differentially related and are disposed to effect the generation of a voltage in the armature of the regulator-generator which is a function of the speed of, and the load carried by, the motor. A differential field winding is provided on the regulator-generator and connected in series circuit relation with the main field winding of the generator of the Ward-Leonard control system for opposing the combined action of the series and shunt field windings. The armature of the regulator generator is connected in series circuit relation with the differential field winding and the field winding of the generator and to the controller, which may be operated to independently vary the flow of current through the main generator field winding.

We have found that the foregoing system has a disadvantage in that any change, which is produced in the current flow through the main field winding of the generator by current which is obtained from the regulator-generator, causes a change in the current flow through the main field winding of the generator that is obtained from the controller. In other words, the current flow through the main field winding of the generator is not independently a function of the setting of the controller and the corrective effect which is provided by the regulator-generator in response to the load and speed of the motor of the Ward-Leonard control system. It is, therefore, necessary when the system of the foregoing mentioned application is used, to effect certain compromises and to make certain adjustments that will permit its proper operation. However, the desired corrective effect cannot be independently introduced into the main field winding of the generator by the regulator-generator when the foregoing system is employed because of the interdependence of the effects which are produced by the controller and by the regulator-generator.

The object of our invention, generally stated, is to provide a control system which shall be simple, efficient and accurate in operation and which may be readily and economically manufactured and installed.

An important object of our invention is to provide for operating the motor of a Ward-Leonard control system at various constant speeds, regardless of variable characteristics of the system.

Another important object of our invention is to provide for rendering the functioning of the motor of a Ward-Leonard control system entirely independent of variable characteristics which might otherwise affect the functioning of the motor.

Still another important object of our invention is to provide for independently controlling the flow of current through the main field winding of the generator of a Ward-Leonard control system from a plurality of independent sources.

A further important object of our invention is to provide for independently controlling the flow of current through a device by independently varying the effect of two independent control sources.

Another object of our invention is to provide for controlling the functioning of the generator of a Ward-Leonard control system in accordance with the speed of the motor in such manner as to maintain the speed of the motor at various predetermined values regardless of the variable operating characteristics of the system.

Still another object of our invention is to provide for controlling the functioning of the generator of a Ward-Leonard control system in accordance with departures of the speed of the motor from predetermined speeds and in accordance with the magnitude of the departures.

A further object of our invention is to provide a regulator-generator having its armature connected in series circuit relation with the main generator field winding of a Ward-Leonard control system and arranged to cause current to flow through the main generator field winding in accordance with the current and voltage applied to the motor of the Ward-Leonard system by the generator and the current flowing through the main generator field winding.

A still further object of our invention is to provide a regulator-generator having its armature connected in series circuit relation with the main generator field winding of a Ward-Leonard control system, one of its field windings connected to be responsive to the current supplied to the motor of the Ward-Leonard system by the generator, another of its field windings connected to be responsive to the voltage applied to the motor, and a third field winding connected to be responsive to the current flowing through the main generator field winding.

Still another object of our invention is to provide a system for controlling the flow of current through the main field winding of the generator of a Ward-Leonard control system comprising a balanced Wheatstone bridge circuit arranged to be connected to a control source in a plurality of steps and having the main field winding of the generator in one of the branches and a regulator-generator having an armature connected across the bridge circuit, series and shunt field windings differentially connected to be respectively responsive to the current and voltage applied to the motor of the Ward-Leonard control system, and a differential field winding connected in series circuit relation with the main field winding and differentially related to the shunt field winding.

A further object of our invention is to provide a balanced Wheatstone bridge circuit for independently controlling the flow of current through a device connected in one of its branches by connecting one control source across one pair of opposite terminals of the bridge circuit, and another control source across the remaining pair of opposite terminals of the bridge circuit.

Other objects of our invention will, in part, be obvious and, in part, appear hereinafter.

Our invention, accordingly, is disclosed in the embodiment hereof shown in the accompanying drawings, and comprises the features of construction, combination of elements and arrangement of parts which will be exemplified in the construction hereinafter set forth, and the scope of the application of which will be indicated in the appended claims.

For a more complete understanding of the nature and scope of our invention, reference may be had to the following detailed description, taken in connection with the accompanying drawings, in which.

Figure 1:
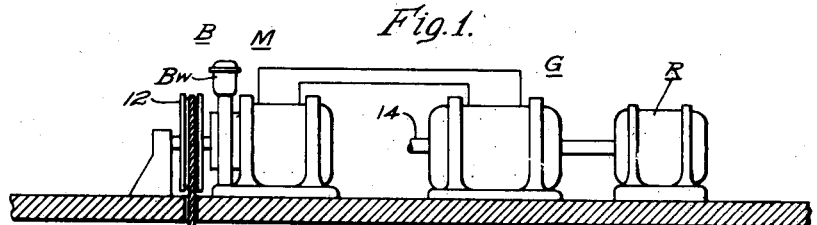
Figure 1 illustrates diagrammatically the arrangement of an elevator car in a hatchway.

In order to practice our invention, a Ward-Leonard control system is provided in which the motor is mechanically coupled, as set forth hereinbefore, to operate the elevator car in the hatchway. The motor is provided with a separately excited field winding which is arranged to be energized in a single direction only. A generator is provided having its armature connected to the armature of the motor. The control of the speed of the motor, and consequently, of the elevator car, as well as the direction thereof, is effected by varying the amount and direction of the excitation of the main field winding of the generator. This control may be effected in a few or many steps, depending upon the type of operation which is desired.

In order to maintain the speed of the motor at various constant values corresponding to various settings of the controller used for controlling the current flowing through the main field winding of the generator, a regulator-generator is provided which is arranged to measure the speed and load of the motor and the current flowing through the main field winding of the generator. The armature of the regulator-generator is arranged to be connected in series circuit relation with the generator field winding so that the voltage generated in the armature in response to the speed and load of the motor and the current flowing through the generator field winding will cause a current to flow through the main generator field winding, which will be a function of the departure of the motor speed from a predetermined value corresponding to the particular setting of the controller of the main field winding. Under certain load and operating conditions, no voltage will be generated in the armature of the regulator-generator since under these conditions, the speed of the motor corresponds to the setting of the controller. For all other conditions, however, a voltage will be generated in the armature of the regulator-generator in such direction and value as to cause the required current to flow through the main field winding of the generator to operate the motor at the desired speed.

In order to measure the speed and load applied to the motor, the regulator-generator is provided with a series field winding through which all or a portion of the current from the generator flows. The regulator-generator is also provided with a main field winding which is connected to be responsive to the voltage applied to the motor. These two field windings are differentially related so that the resulting flux is a function of the speed of the motor, as measured by its counter E. M. F., that is, the flux generated by the series field winding is proportional to the IR drop of the motor armature, and the flux generated by the main field winding of the regulator-generator is proportional to the voltage impressed across the terminals of the armature of the motor. Thus, the resulting flux due to the differential relationship between the two field windings, is a function of the counter E. M. F. of the motor. Since this flux results from the combined action of the current flowing through the motor armature and the voltage applied thereto, it is also a function of the load carried by the motor. The voltage which is generated in the armature of the regulator-generator due to this resulting flux, is then a function of the speed of the motor and the load carried thereby.

It is desirable that any change caused by the voltage generated in the regulator armature and affecting the current flowing through the main field winding of the generator be immediately reflected in the voltage generated in the armature of the regulator-generator. Such action is desired in order to prevent hunting of the system. As soon as a voltage appears in the armature of the regulator-generator, indicating that the speed of the motor has departed from the desired speed, a change in the flow of current through the main field winding of the generator takes place in such direction as to tend to restore the speed of the motor to the desired speed. If some means is not provided for immediately effecting a corresponding change in the corrective voltage generated in the armature of the regulator-generator, the resulting change in the fluxes of the series and main field windings of the regulator-generator in response to the corrective effect, will take place too late. As a result, the speed of the motor will be altered more than is desired and hunting will result.

In order to make the correction applied by the regulator-generator proportional to the departure of the speed of the motor from the desired speed corresponding to a particular setting of the controller for the main field winding of the generator, a differential field winding is provided in the regulator-generator, and is connected in series circuit relation with the main field winding of the generator. Thus, any change in current which flows through the main generator field winding is immediately reflected in the voltage which is generated by the armature of the regulator-generator. It is then unnecessary to await the correction in the speed of the motor, as reflected in the change in the fluxes generated by the series and main field windings of the regulator-generator to correspondingly affect the voltage generated by the armature of the regulator-generator. The differential field winding of the regulator-generator is arranged to generate a flux in the same direction as the flux generated by the series field winding of the regulator-generator and, therefore, it opposes or is differentially related to the flux which is generated by the main field winding of the regulator-generator. There is always, then, a certain relationship between the speed and load of the motor and the corrective effect caused thereby in altering the flow of current through the main field winding of the generator. As a result, the system is free from hunting and the speed of the motor is maintained at predetermined values corresponding to various settings of the controller regardless of the many variable conditions which would otherwise affect the speed and cause it to change from the desired values.

As has been stated hereinbefore, it is desirable to effect a corrective action in the current flowing through the main field winding of the generator by means of the regulator-generator, without altering the current flow through the main field winding from the controller. It is then possible to maintain a precise relationship between the speed of the motor and the corresponding movement of the elevator car and the various settings of the controller, regardless of the load or other variable conditions which affect the operation of the motor.

We have discovered that a Wheatstone bridge circuit may be employed to effect the desired independent control of the current flowing through the main field winding of the generator. A balanced Wheatstone bridge circuit is provided in which the differential field winding and the main generator field winding are connected in series circuit relation and form a part or all of one of the branches. The armature of the regulator-generator is connected across one pair of opposite terminals of the Wheatstone bridge circuit while the remaining pair of terminals is connected through the controller to the independent control source. With such an arrangement, it is possible to vary the current flowing through the branch of the bridge containing the main field winding of the generator by means of the controller, independently of the current flow therethrough from the armature of the regulator-generator, and vice versa. In order to show that this relationship exists, a detailed mathematical analysis of this system will be set forth hereinafter.

Referring now particularly to Fig. 1 of the drawings, the reference character 10 designates, generally, an elevator car which may be supported in a hatchway or shaft by means of a cable 11 which is passed over a sheave 12 and balanced by suitable counterweights 13. The elevator car 10 is provided with a slowdown inductor relay E and a landing inductor relay F. The slowdown inductor relay E is provided with normally closed contact members E1 and E2 while the landing inductor relay F is provided with normally closed contact members F1 and F2. When the operating winding of the slow down inductor relay E is energized, no action takes place until the contact members E1 or E2 come into proximity, respectively, with the inductor plates UE and DE, depending upon the direction of travel of the elevator car. Assuming that the elevator car 10 is travelling in the up direction, and that the operating winding of the slowdown inductor relay E is energized, the contact members E1 will be opened as soon as they are moved into proximity to the inductor plate UE. A resulting control function then takes place which will be set forth hereinafter. The contact members F1 and F2 of the landing inductor relay F are also opened when they come into proximity, respectively, to the inductor plates UF and DF. The elevator car 10 is also provided with a master switch MS having three positions, the extreme outer positions corresponding to up and down movement of the car, and the central position to a position to stop the car.

Figure 4:
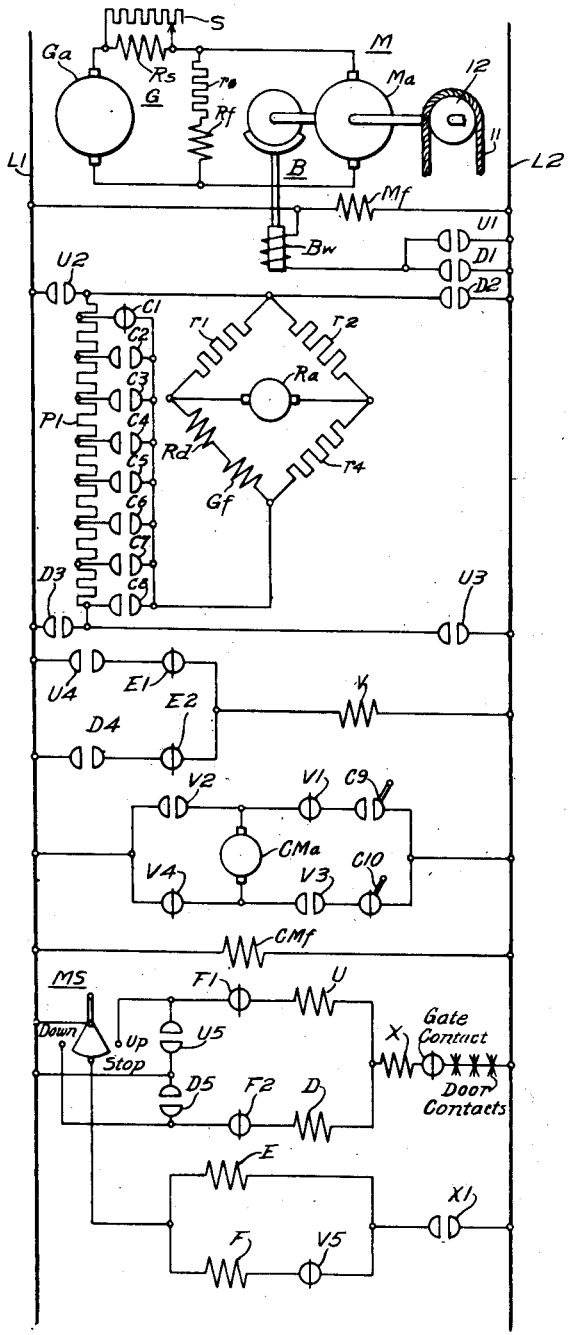
Fig. 4 illustrates diagrammatically one modification of my invention.
Figure 4A:
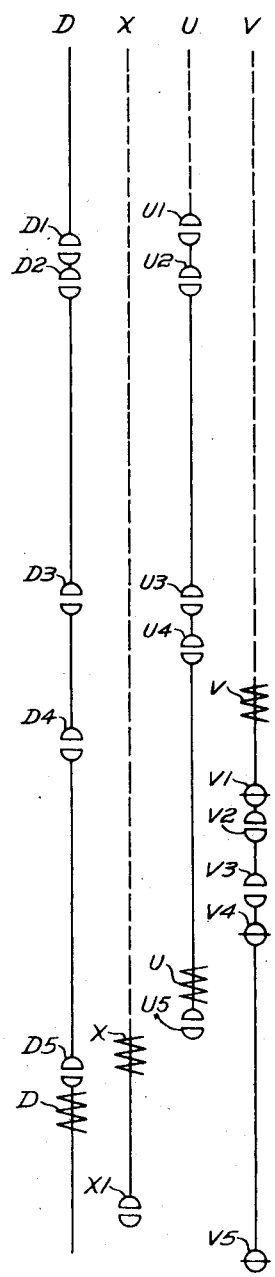
Fig. 4A shows the relationship between certain of the various operating windings and contact members of the relays and switches illustrated in Fig. 4.
Figure 5:
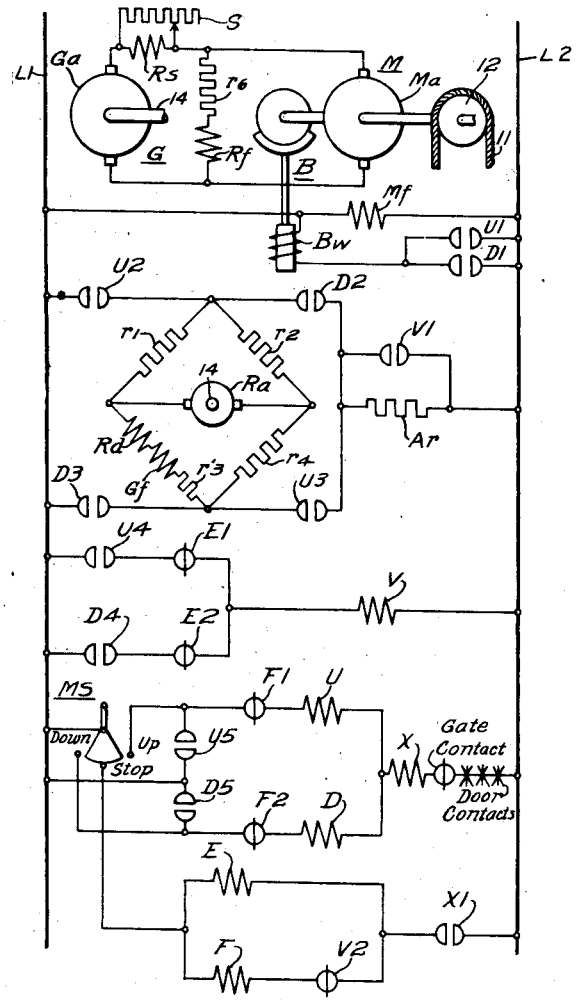
Fig. 5 illustrates diagrammatically another system in which our invention may be employed.
Figure 5A:
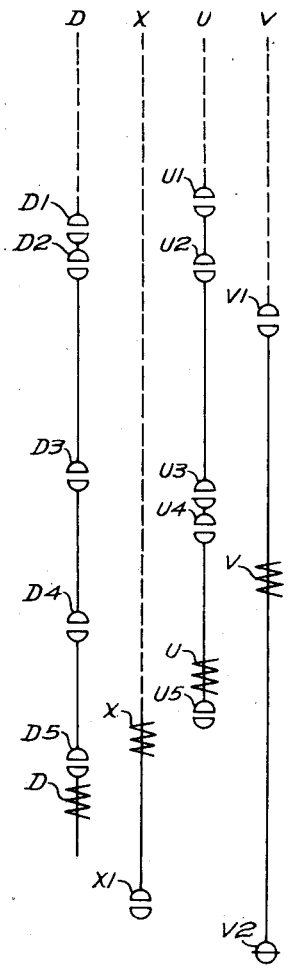
Fig. 5A illustrates the physical arrangement of certain of the operating windings and contact members of the relays and switches illustrated in Fig. 5.

In order to operate the elevator car 10 in the hatchway, a Ward-Leonard control system is provided which comprises a motor M that is arranged to be mechanically coupled, as illustrated, to the sheave 12. As shown in Figs. 4 and 5 of the drawings, the motor M comprises an armature $Ma$ and a main field winding $Mf$, the latter being arranged to be separately excited from normally energized conductors L1 and L2. A brake B is provided having a brake-releasing winding $Bw$ for releasing it on energization of the motor M.

Figure 6:
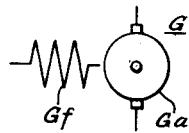
Fig. 6 illustrates schematically the arrangement of the generator armature and main field winding.

The motor is arranged to be energized by means of a generator G having, as shown in Figs. 4, 5 and 6, an armature $Ga$ and a main field winding $Gf$. The armature $Ga$ of the generator G is arranged to be mounted on a shaft 14 which may be driven by any suitable motive means, such as an induction motor (not shown), that may be connected to an alternating-current source of supply.

Figure 7:
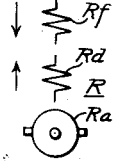
Fig. 7 illustrates schematically the arrangement of the regulator-generator armature and its field windings.

In order to control the functioning of the system, a regulator-generator R is provided having an armature $Ra$ which may be mounted on the shaft 14. As shown in Fig. 7 of the drawings, the regulator-generator R is provided with a shunt field winding $Rf$, a differential field winding $Rd$ and a series field winding $Rs$. As indicated by the arrows, the differential field winding $Rd$ and the series field winding $Rs$ are arranged to generate fluxes in a direction opposite to the direction of the flux generated by the shunt field winding $Rf$ of the regulator-generator. The particular connections for the various field windings and the armature of the regulator-generator in the control systems are illustrated in Figs. 4 and 5 of the drawings, and they will be set forth in detail hereinafter.

In response to the operation of the master switch MS, up or down reversing switches U and D are operated. On the operation of either of the up or down switches, an auxiliary switch X is operated to complete a circuit for energizing the operating windings of the inductor relays E and F.

As soon as either the up or the down switch U or D is operated, a potentiometer P1 is connected across the conductors L1 and L2. The current flowing through the potentiometer P1 is in one direction when the up reversing switch U is energized, and in a reverse direction when the down reversing switch D is energized.

Figure 2:
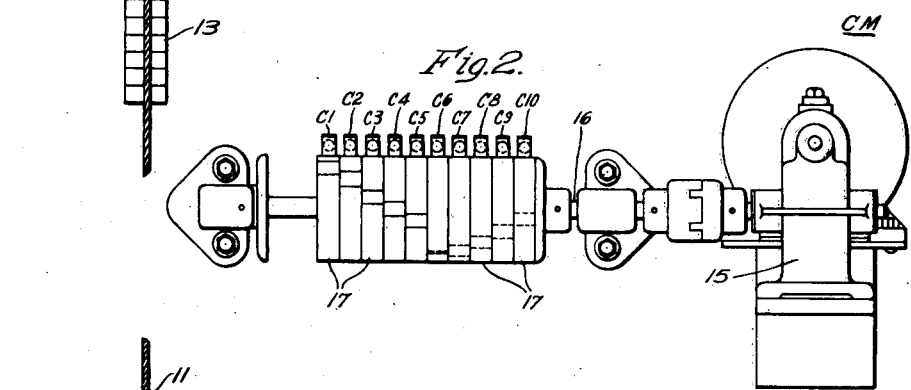
Fig. 2 is a view, in side elevation, showing the construction of a controller used for varying the resistance connected in circuit with the main field winding of the generator.
Figure 3:
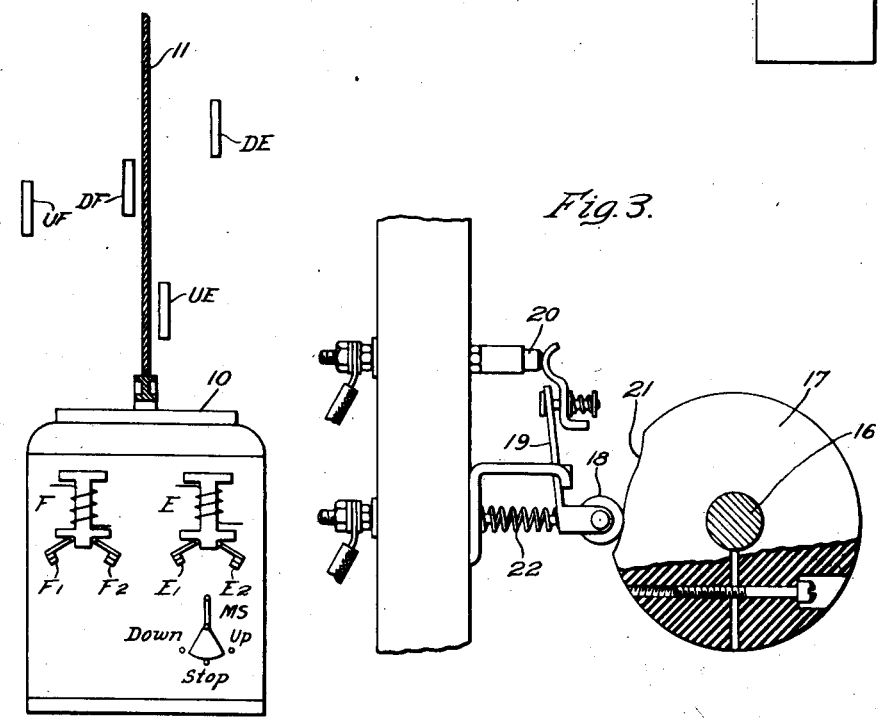
Fig. 3 is a view, partly in side elevation and partly in section, of a typical arrangement of the contact members of the controller shown in Fig. 2.

In order to accelerate the motor M, the current flowing through the main generator field winding $Gf$ is increased by increasing the voltage applied thereto from the potentiometer P1. This voltage is gradually increased by the successive closing and opening of contact members C2 through C7, which as shown in Figs. 2 and 3 of the drawings, are arranged to be successively operated by means of a control motor CM. The control motor CM is arranged to operate through a reduction gearing mechanism 15 to rotate a shaft 16 on which a series of cams 17, composed of insulating material, is mounted. As shown more clearly in Fig. 3 of the drawings, a cam 17 is arranged to engage a roller 18 on the periphery thereof and to normally hold a movable contact member 19 out of engagement with a fixed contact member 20. The cam 17 is provided with a recessed portion 21 which is arranged to permit the roller 18 to move under the influence of a biasing spring 22, so that the movable contact member 19 is permitted to engage the fixed contact member 20. It will be understood that the cams 17 may be positioned on the shaft 16 in any desired relative positions to effect the sequential opening and closing of the contact members C1 through C8, as may be desired. In order to stop the operation of the control motor CM after it has reached its limit of travel, contact members C9 and C10 are provided. The contact members C10 are arranged to remain in the closed position until the control motor has reached its limit of travel after being initially energized. At this time contact members C10 are opened to terminate further motion of the control motor CM in this direction, contact members C9 having been closed as soon as the control motor CM was energized. The contact members C9 are arranged to remain in the closed position until the control motor CM has been restored to the initial position, at which time they are opened. It will be understood that the cams 17, associated with these contact members, may be suitably arranged to effect this desired operation.

As illustrated in Fig. 4 of the drawings, the control motor CM is provided with an armature CMa and a separately excited field winding CMf. The direction of rotation of the armature CMa is effected by reversing the polarity of the voltage applied thereto from the conductors L1 and L2 by means of a speed relay V.

It is desirable to independently control the flow of current through the main field winding Gf of the generator, from two sources, one of the sources comprising the energized conductors L1 and L2 across which the potentiometer P1 is connected, and the other source comprising the armature Ra of the regulator-generator. For this purpose the Wheatstone bridge circuit is employed comprising the customary four branches, three of which may be resistors $r_1$, $r_2$ and $r_4$, the remaining branch comprising the differential field winding Rd of the regulator-generator and the main field winding Gf of the generator. The armature of the regulator-generator is connected across a pair of opposite terminals of the bridge circuit while the remaining pair of terminals is connected through the potentiometer P1 to the energized conductors L1 and L2. The series field winding Rs of the regulator-generator is arranged to be connected, as illustrated, in the circuit connecting the armatures Ga and Ma of the generator and motor, respectively. A shunt S may be provided for adjusting the flow of current through the series field winding Rs. The shunt field winding Rf of the regulator-generator is connected through a resistor $r_6$ across the terminals of the motor armature Ma. The resistor $r_6$ is employed in order to reduce the heat loss in the shunt field winding Rf, and consequently, the effect of a change in its resistance, due to temperature rise, to a minimum.

Figure 8:
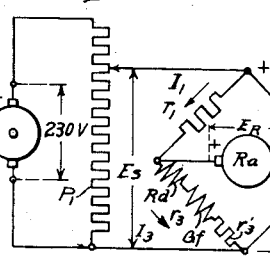
Figs. 8 and 9 illustrate diagrammatically the arrangement of certain of the control circuits for the purpose of analysis and description of our invention.
Figure 9:
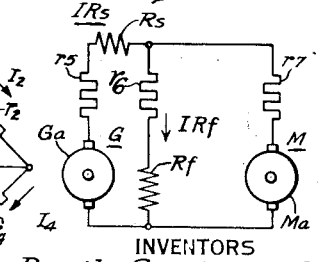

In order to permit an analysis of the Wheatstone bridge circuit and its functioning in conjunction with the regulator-generator R, the circuits in Figs. 8 and 9 are shown. The voltage $E_s$ represents an independent control voltage which may be obtained from the potentiometer P1. The four branches of the bridge are identified by the reference characters $r_1$, $r_2$, $r_3$ and $r_4$. The voltage $E_R$ is that which is obtained from the armature Ra of the regulator-generator R in response to the combined action of the series field winding Rs, shunt field winding Rf and the differential field winding Rd. The various values of resistance in ohms of the various elements comprising the Wheatstone bridge circuit that we have employed in a concrete embodiment of the invention are indicated by $r_1$, $r_2$, $r_3$ and $r_4$. We have found that it is desirable to make the resistances of the branches $r_3$ and $r_4$ the same. An additional resistor $r'_3$ is inserted in the branch $r_3$ for a purpose which will be set forth hereinafter. The currents flowing through the various branches are indicated by arrows to which the reference characters $I_1$, $I_2$, $I_3$ and $I_4$ are applied, as indicated. In Fig. 9 of the drawings, the resistance of the generator-armature Ga is indicated by the resistor $r_5$ and the corresponding resistance of the motor armature Ma is indicated by the resistor $r_7$.

In order to show that the current flowing through the generator field winding Gf in one of the arms of the bridge circuit may be independently changed by altering either the control voltage or the voltage supplied by the regulator-generator R, the following derivation for the current flowing through this winding is set forth, with reference to Fig. 8 of the drawings, based on the assumption that the bridge circuit is balanced, that $r_1=r_2$ and that $r_3=r_4$:

1. $E_s = I_1 r_1 + I_3 r_3$ and $I_1 = \dfrac{E_s - I_3 r_3}{r_1}$

2. $E_R = I_3 r_3 - I_4 r_4$ and $I_4 = \dfrac{I_3 r_3 - E_R}{r_4}$

3. $E_s = I_2 r_2 - E_R + I_3 r_3$ and $I_2 = \dfrac{E_s + E_R - I_3 r_3}{r_2}$

4. $I_1 + I_2 = I_3 + I_4$ and $I_3 = I_1 + I_2 - I_4$

Solving for $I_3$ from 1, 2, and 3

5. $I_3 = \dfrac{E_s - I_3 r_3}{r_1} + \dfrac{E_s + E_R - I_3 r_3}{r_2} - \dfrac{I_3 r_3 - E_R}{r_4}$ simplifying, since $r_1 = r_2$ and $r_3 = r_4$ 6. $I_3 = \dfrac{E_s}{r_1} - \dfrac{I_3 r_3}{r_1} + \dfrac{E_s}{r_1} + \dfrac{E_R}{r_1} - \dfrac{I_3 r_3}{r_1} - I_3 + \dfrac{E_R}{r_3}$ 7. $\dfrac{I_3(2r_1 + 2r_3)}{r_1} = \dfrac{2E_s}{r_1} + \dfrac{(r_1 + r_3)E_r}{r_1 r_3}$ 8. $I_3 = \dfrac{E_s}{r_1 + r_3} + \dfrac{E_R}{2r_3}$ It will now be observed that either the control voltage $E_s$ or the regulator voltage $E_R$ may be altered to independently effect changes in the current $I_3$ flowing through the generator field winding Gf.

It is desirable, as set forth hereinbefore, to maintain a predetermined relationship between the speed of the motor M and the setting of the controller as represented by the control voltage $E_s$ regardless of the variable characteristics of the system or the direction of travel of the elevator car. The regulator-generator R serves as an automatic compensator to effect this desired relationship. When it is employed, there is a constant relation between the speed of the elevator car or the motor M and the applied control voltage, which relation, due to the regulator-generator R, is unaffected by the variable characteristics of the system. This relationship will be shown in the derivation which follows, reference being had to Figs. 8 and 9 of the drawings.

The voltages generated by the regulator-generator, when the field windings are individually excited, may be represented by the following equations:

9. Voltage due to excitation of regulator series field winding $R_s = k_1 I_{RS}$ 10. Voltage due to excitation of regulator main field winding $R_f = k_2 I_{Rf}$ 11. Voltage due to excitation of regulator differential field winding $R_d = k_3 I_{Rd}$.

The constants, $k_1$, $k_2$ and $k_3$ are obtained from the magnetization curves of the regulator-generator R, when it is individually excited by the various field windings.

The voltage $E_R$ generated by the regulator armature Ra equals the sum of the individual voltages generated by the three field windings when they are simultaneously energized. It will be recalled that the flux generated by the shunt field winding Rf opposes the flux generated by the field windings Rs and Rd. The regulator armature voltage $E_R$ may then be represented by the following equation:

12. $E_R = k_1 I_{RS} - k_2 I_{Rf} + k_3 I_{Rd}$ since $I_3 = I_{Rd}$ equation 8 may be rewritten as follows:

13. $E_R = 2r_3 I_{Rd} - \dfrac{2r_3 E_s}{r_1 + r_3}$

The current flowing through the shunt field winding $R_f$ of the regulator-generator may be represented by the following equation:

14. $$I_{Rf} = \frac{E_G - r_5 I_{RS}}{r_5 + r_6 + R_f}$$

We have found that it is desirable to make the sum of the resistances $r_3$ and $r_4$ of the two lower legs of the bridge equal to the constant $k_3$. Employing this relationship and combining 12 and 13, the following equation is obtained:

15. $$k_1 I_{R_s} - \frac{k_2(E_G - r_5 I_{RS})}{r_5 + r_6 + r_7} + k_3 I_{Rd} = k_3 I_{Rd} - \frac{2r_3 E_s}{r_1 + r_3}$$

Solving for $E_G$,

16. $$E_G = \frac{2(r_5 + r_6 + R_f)r_3 E_s}{k_2(r_1 + r_3)} + \frac{[k_2 r_5 + (r_5 + r_6 + R_f)k_1]I_{RS}}{k_2}$$

In a control system employing a regulator-generator of the type described herein, we have employed the following values of resistance and constants:

$r_1 =$ 29.0 ohms
$r_2 =$ 29.0 ohms
$r_3 =$ 50.5 ohms
$r'_3 =$ 5.0 ohms
$r_4 =$ 50.5 ohms
$r_5 =$ 0.06 ohm
$r_6 =$ 287.0 ohms
$r_7 =$ 0.05 ohm
$R_d =$ 40.0 ohms
$R_f =$ 41.0 ohms
$G_f =$ 5.5 ohms
$k_1 =$ 0.041 volt per ampere
$k_2 =$ 270.0 volts per ampere
$k_3 =$ 101.0 volts per ampere Substituting the appropriate values in 16

17. $$E_G = 1.545\, E_s + .11\, I_{RS}$$

Since the resistance of the regulator series field winding $R_s$ is negligible and the current flowing through the main field winding $R_f$ is also negligible as compared to the current flowing to the motor M, both of these values may be neglected and the counter, E. M. F. of the motor M or its speed may be represented:

18. $$E_M = E_G - I_{RS}(r_5 + r_7)$$

Substituting the appropriate values for $r_5$ and $r_7$

19. $$E_M = E_G - .11\, I_{RS}$$

Combining 17 and 19

20. $$E_M = 1.545\, E_s$$

Equation 20 shows that the speed of the motor M, as represented by its counter E. M. F., or the speed of the elevator car will always be directly proportional to the control voltage $E_s$ regardless of the variable characteristics in the operation of the system.

In describing the operation of the system shown in Fig. 4 of the drawings, it will be assumed that the conductors L1 and L2 have applied thereto a suitable control voltage, that the generator G and the regulator-generator R are being operated at the proper speed and that it is desired to move the elevator car 10 in the up direction. The operator then moves the master switch MS to the up position to effect the energization of the operating winding of the up reversing switch U, as well as the energization of the operating winding of the auxiliary switch X. The circuit for effecting the energization of these windings may be traced as follows:

L1, MS, up contacts, F1, U, X, gate contact, door contacts, L2

At contact members U5, a holding circuit is provided around the master switch MS. The brake B is released by the energization of the brake winding Bw in response to the operation of the up reversing switch U. The circuit for releasing the brake winding may be traced as follows:

L1, Bw, U1, L2

The potentiometer P1 is connected directly across the conductors L1 and L2 on the closure of contact members U2 and U3 in response to the operation of the up reversing switch U. Current is then caused to flow through the main generator field winding Gf in part because of the voltage which is obtained from the first section of the potentiometer P1, due to the fact that contact members C1 are closed, and in part because of the voltage which is obtained from the armature Ra of the regulator-generator R.

The operating winding of the speed relay V is energized in response to the operation of the up reversing switch U over a circuit which may be traced as follows:

L1, U4, E1, V, L2

As a result of the energization of the speed relay V, a circuit is completed for energizing the armature CMa of the control motor CM. This circuit may be traced as follows:

L1, V2, CMa, V3, C10, L2

The contact members C1 are then opened and the remaining contact members C2 through C7 are successively closed and opened, contact members C8 being closed but not opened, thereby increasing the voltage which is applied to the main generator field winding Gf to correspondingly increase the voltage which is applied to the armature Ma of the motor M. As soon as the contact members C10 are opened, the armature CMa is deenergized, contact members C8 remaining closed.

As has been set forth hereinbefore, it is desirable that the speed of the motor M be at a certain value for each of the steps of control voltage obtained from the potentiometer P1. It is then possible to obtain a smooth acceleration curve which will be unaffected by the many variables in the system that have been set forth in detail hereinbefore. In addition, it is also desired that the same speed relationship exist when the contact members C1 through C8 are operated in a reverse order to effect the deceleration of the motor M and the elevator car driven thereby.

We have found that the desired speed relationship will exist regardless of the variable characteristics of the elevator system, or the connections to the potentiometer P1, when the regulator-generator R is employed and its field windings are connected as shown in conjunction with the balanced Wheatstone bridge circuit. Because of the connection of the differential field winding Rd in series circuit relation with the main generator field winding Gf in one of the branches of the bridge circuit, the changes which are introduced to effect a corrective action through the generator G are immediately reflected in the voltage which is generated in the armature Ra of the regulator-generator. As a result, the corrective effect which is applied by the regulator-generator R is, in a sense, proportional to the degree of variation in the speed of the motor M from the desired speed.

When it is desired to stop the elevator car at a particular floor, the operator centers the master switch, thereby completing a circuit for energizing the operating winding of the slowdown inductor relay E. This circuit may be traced as follows:

L1, MS, stop contacts, E, X1, L2

As soon as the contact members E1 come into proximity with the up inductor plate UE, they are opened and the previously traced energizing circuit for the operating winding of the speed relay V is interrupted.

The armature of the control motor CMa is energized in a reverse direction to effect the operation of the contact members C1 through C8 in a reverse sequence. The circuit for now energizing the control motor armature CMa may be traced as follows:

L1, V4, CMa, V1, C9, L2

The contact members C7 through C2 are successively closed and opened to effect a decrease in the flow of current through the main generator field winding Gf. During this interval, the regulator-generator R is effective to maintain the speed of the motor M at values corresponding to the contact members which are closed. As a result, regardless of the variable conditions or loading of the elevator system, or the connections to the potentiometer P1, the elevator car 10 will be decelerated at a uniform rate.

A further result of the deenergization of the speed relay V is to close contact members V5 and to complete an obvious energizing circuit for the operating winding of the landing inductor relay F in parallel with the operating winding of the slowdown inductor relay E. As soon as contact members F1 come into proximity with the up inductor plate UF, the previously traced energizing circuit for the operating winding of the up reversing switch U and the auxiliary switch X, is interrupted. These switches are deenergized. The potentiometer P1 is disconnected from the conductors L1 and L2 and the previously traced energizing circuit for the brake winding Bw is opened. The brake B is then applied and the elevator car 10 is brought to rest at the desired floor.

In order to further point out the application of our invention, reference may be had to the circuits shown in Fig. 5 of the drawings. The circuit connections there shown are identical with those shown in Fig. 4, with the exception that the potentiometer P1 and the control motor CM are omitted. Also, the speed relay V is arranged to short circuit an accelerating resistor Ar which is connected in series circuit relation with the bridge circuit to permit the operation of the motor M to full speed in one step.

As shown in Fig. 5 of the drawings, the armature Ra of the regulator-generator is connected across two of the terminals of a Wheatstone bridge, as set forth hereinbefore, one leg of which comprises the differential field winding Rd of the regulator-generator, and the main field winding Gf of the generator G. The remaining legs of the Wheatstone bridge comprise resistors $r_1$, $r_2$ and $r_4$. The terminals of the Wheatstone bridge not connected to the armature Ra are arranged to be connected to the conductors L1 and L2 through the accelerating resistor Ar, and these connections may be reversed by means of the up and down reversing switches U and D.

Since the sequence of operation of the system shown in Fig. 5 of the drawings is somewhat similar to that set forth hereinbefore in connection with Fig. 4, only the portion necessary to illustrate the function of the Wheatstone bridge will now be set forth. As soon as the master switch MS is operated, to the up position for example, contact members U2 and U3 are closed to connect the Wheatstone bridge in series circuit relation with the accelerating resistor Ar and across the conductors L1 and L2. The brake winding Bw is energized to release the brake B and the motor M is then energized to move the elevator car in the up direction. The voltage which is applied to the main generator field winding Gf of the generator G is then a function of the voltage existing across the conductors L1 and L2, less the voltage which is consumed in the accelerating resistor Ar, and is further proportional to the voltage which is generated in the armature Ra of the regulator-generator. As is set forth hereinbefore, the voltage which is generated by the armature Ra may be independently applied to the generator field winding Gf and this effect will be entirely independent of the effect which is caused by the voltage which is applied thereto from the source represented by the conductors L1 and L2.

When the speed relay V is energized, contact members V1 are closed to short circuit the accelerating resistor Ar. The Wheatstone bridge circuit is then connected directly across the conductors L1 and L2. The regulator-generator R then functions to maintain the proper current in the generator field winding Gf, so that the motor M will operate at a fixed speed regardless of the load or variable conditions affecting it.

Referring to Fig. 5, it will be noted that the winding Rf of the regulator R may be regarded as a shunt-type winding, whereas the winding Rs is a series-type winding. The windings Rf and Rs together produce an excitation component, or effect, dependent upon the speed of motor M. The winding Rd, which may be termed an excitation winding, produces an effect which acts differentially with reference to the effect of the two windings Rf and Rs combined.

Considering the generator field circuit as a whole, it will be noted that this circuit is divided at a number of junction points and includes a number of branches. The branch which includes the field windings Rd and Gf and the resistor $r'_3$ may be termed an excitation circuit. The loop circuit which includes the armature Ra, the field windings Rd and Gf and the resistors $r'_3$ and $r_4$ may be considered as a self-exciting circuit. The bridge resistors $r_1$, $r_2$ and $r_4$, by balancing the entire circuit, prevent the interchange of energy between the regulator R and the supply conductors L1 and L2. The source consisting of the supply conductors L1 and L2, together with the resistor Ar may be regarded as a control means, or rheostatic means, for varying a component of excitation of the main generator G. Similarly the regulator R, may be considered as a regulating means responsive to an operating characteristic of the motor M, namely, its speed, for controlling a component of excitation of the generator G.

We do not intend that our invention shall be restricted to the specific structural details, arrangement of parts or circuit connections herein set forth, as various modifications thereof may be effected without departing from the spirit and scope of our invention. We desire, therefore, that only such limitations shall be imposed as are indicated in the appended claims.

We claim as our invention:

1. In a direct-current motor control system, a first dynamo-electric machine having an armature; a second dynamo-electric machine having an armature serially connected with said first-mentioned armature and having a field winding, one of said machines being driven at substantially constant speed with variable excitation and the other of said machines being operated as a motor at variable speed; regulating means for varying a component of current in said field winding; control means for varying a component of current in said field winding; and means for preventing interchange of energy between said regulating means and said control means.

2. In a direct-current motor control system, a first dynamo-electric machine having an armature; a second dynamo-electric machine having an armature serially connected with said first-mentioned armature, one of said machines being driven at substantially constant speed with variable excitation and the other of said machines being operated as a motor at variable speed; regulating means responsive to an operating characteristic of one of said dynamo-electric machines for varying a component of current in said field winding; control means for varying a component of current in said field winding independently of the operating characteristics of said dynamo-electric machines; and means for preventing interchange of energy between said regulating means and said control means.

3. In a direct-current motor control system, a first dynamo-electric machine having an armature; a second dynamo-electric machine having an armature serially connected with said first-mentioned armature and having a field winding, one of said machines being driven at substantially constant speed with variable excitation and the other of said machines being operated as a motor at variable speed; a divided energizing circuit for said field winding, said energizing circuit having a first branch and a second branch; a control element included in said first branch; a control element included in said second branch; and means for preventing interchange of energy between said first branch and said second branch.

4. In a direct-current motor control system, a first dynamo-electric machine having an armature; a second dynamo-electric machine having an armature serially connected with said first-mentioned armature and having a field winding, one of said machines being driven at substantially constant speed with variable excitation and the other of said machines being operated as a motor at variable speed; a source of direct-current; rheostatic means adjustably connecting said field winding to said source, a regulating generator responsive to an operating characteristic of one of said dynamo-electric machines for supplying a variable current component to said field winding, and means for preventing current flow from said regulating generator through said rheostatic means.

5. In a direct-current motor control system, a motor having an armature; a generator having an armature serially connected with said first-mentioned armature and having a field winding, said generator being driven at substantially constant speed; regulating means for counteracting the effect of variables on the speed of said motor, said regulating means comprising means for producing an effect dependent on the speed of said motor, means serially connected with said field winding for producing an effect dependent on the current therein, and means differentially responsive to said effects for controlling a component of excitation of said generator; control means for varying a component of excitation of said generator independently of the operating characteristics of said motor and said generator; and means for preventing interchange of energy between said regulating means and said control means.

6. In a direct-current motor control system, a motor having an armature; a generator having an armature serially connected with said first-mentioned armature and having a field winding, said generator being driven at substantially constant speed; regulating means for counteracting the effect of variables on the speed of said motor, said regulating means comprising means for producing a first effect proportional to the load current supplied to said motor, means for producing a second effect proportional to a voltage condition of one of said armatures, means serially connected with said field winding for producing a third effect dependent on the current therein, and means responsive to the sum of said first and third effects minus said second effect for controlling a component of excitation of said generator; control means for varying a component of excitation of said generator independently of the operating characteristics of said motor and said generator; and means for preventing interchange of energy between said regulating means and said control means.

7. In a direct-current motor control system, a first dynamo-electric machine having an armature; a second dynamo-electric machine having an armature serially connected with said first-mentioned armature and having a field winding, one of said machines being driven at substantially constant speed with variable excitation and the other of said machines being operated as a motor at variable speed; a source of control current; impedance means; conducting means connecting said field winding, said impedance means and said source to form a divided circuit having said field winding in a first parallel branch, said impedance means in a second parallel branch and having the junctions of said first and second parallel branches connected to said source; and a source of regulating current dependent upon an operating characteristic of one of said machines, said source of regulating current being connected to said parallel branches in such relationship as to circulate current through said field winding but produce substantially no voltage difference between said junctions.

8. In a direct-current motor-control system, a first dynamo-electric machine having an armature; a second dynamo-electric machine having an armature serially connected with said first-mentioned armature and having a field winding, one of said machines being driven at substantially constant speed with variable excitation and the other of said machines being operated as a motor at variable speed; a source of control current; resistance means; conducting means connecting said field winding, said resistance means and said source to form a divided circuit having said field winding in a first parallel branch, said resistance means in a second parallel branch and having the junctions of said first and second parallel branches connected to said source; and regulating generator means connected to be responsive to a variable operating characteristic of one of said dynamo-electric machines, said regulating generator means being connected to said parallel branches in such relationship as to circulate current through said field winding but produce substantially no voltage difference between said junctions.

9. In a direct-current motor-control system, a first dynamo-electric machine having an armature; a second dynamo-electric machine having an armature serially connected with said first-mentioned armature and having a field winding, one of said machines being driven at substantially constant speed with variable excitation and the other of said machines being operated as a motor at variable speed; a third dynamo-electric machine having an armature connected to said field winding to vary the voltage applied thereto, said third machine having an excitation winding; an excitation circuit connecting said field winding and said excitation winding directly in series; a source of control current connected to energize said excitation circuit; and means for preventing interchange of energy between said third machine and said source.

10. In a direct-current motor-control system, a first dynamo-electric machine having an armature; a second dynamo-electric machine having an armature serially connected with said first-mentioned armature and having a field winding, one of said machines being driven at substantially constant speed with variable excitation and the other of said machines being operated as a motor at variable speed, a third dynamo-electric machine having an armature connected to said field winding to vary the voltage applied thereto, said third machine having an excitation winding and having additional excitation means; means for energizing said additional excitation means in accordance with a variable operating characteristic of said first machine; an excitation circuit connecting said field winding and said excitation winding directly in series; a source of control current connected to energize said excitation circuit; and means for preventing interchange of energy between said third machine and said source.

11. In a direct-current motor-control system, a first dynamo-electric machine having an armature; a second dynamo-electric machine having an armature serially connected with said first-mentioned armature and having a field winding, one of said machines being driven at substantially constant speed with variable excitation and the other of said machines being operated as a motor at variable speed, a third dynamo-electric machine having an armature connected to said field winding to vary the voltage applied thereto, said third machine having an excitation winding, a series-type winding, and a shunt-type winding; means for energizing said series-type winding in accordance with the load current supplied to said first machine; means for energizing said shunt-type winding in accordance with a voltage condition of said first machine; an excitation circuit connecting said field winding and said excitation winding directly in series; a source of control current connected to energize said excitation circuit; and means for preventing interchange of energy between said third machine and said source.

12. In a direct-current motor-control system, a first dynamo-electric machine having an armature; a second dynamo-electric machine having an armature serially connected with said first-mentioned armature and having a field winding, one of said machines being driven at substantially constant speed with variable excitation and the other of said machines being operated as a motor at variable speed, regulating generator means connected to be responsive to a variable operating characteristic of one of said dynamo-electric machines; impedance means; conducting means connecting said field winding, said impedance means and said regulating generator means to form a divided circuit having said field winding in a first parallel branch, said impedance means in a second parallel branch and having the junctions of said first and second parallel branches connected to said regulating generator means; and a source of control current, said source being connected to said parallel branches in such relationship as to circulate current through said field winding but produce substantially no voltage difference between said junctions.

13. In a direct-current motor-control system, a first dynamo-electric machine having an armature; a second dynamo-electric machine having an armature serially connected with said first-mentioned armature and having a field winding, one of said machines being driven at substantially constant speed with variable excitation and the other of said machines being operated as a motor at variable speed; regulating generator means connected to be responsive to a variable operating characteristic of one of said dynamo-electric machines, said regulating generator means having an excitation winding; impedance means; conducting means connecting said field winding, said impedance means and said regulating generator means to form a divided circuit having said field winding and said excitation winding in a first parallel branch, said impedance means in a second parallel branch and having the junctions of said first and second parallel branches connected to said regulating generator means; and a source of control current, said source being connected to said parallel branches in such relationship as to circulate current through said field winding but produce substantially no voltage difference between said junctions.

14. In a direct-current motor-control system, a first dynamo-electric machine having an armature; a second dynamo-electric machine having an armature serially connected with said first-mentioned armature and having a field winding, one of said machines being driven at substantially constant speed with variable excitation and the other of said machines being operated as a motor at variable speed; a regulating generator for controlling an operating characteristic of one of said dynamo-electric machines, said regulating generator having a regulator armature and an excitation winding; and conducting means connecting said field winding and said excitation winding to said regulator armature in a self-exciting circuit, said self-exciting circuit having a total resistance substantially equal to the voltage generated in said regulator armature per ampere in said excitation winding.

15. In a direct-current motor-control system, a first dynamo-electric machine having an armature; a second dynamo-electric machine having an armature serially connected with said first-mentioned armature and having a field winding, one of said machines being driven at substantially constant speed with variable excitation and the other of said machines being operated as a motor at variable speed; a regulating generator for controlling an operating characteristic of one of said dynamo-electric machines, said regulating generator having a regulator armature, an excitation winding and additional excitation means; means for energizing said additional excitation means in accordance with an operating characteristic of one of said dynamo-electric machines; and conducting means connecting said field winding and said excitation winding to said regulator armature in a self-exciting circuit having a total resistance substantially equal to the voltage generated in said regulator armature per ampere in said excitation winding.

16. In a Ward-Leonard control system, in combination, a first dynamo-electric device operatively connected to a load, a second dynamo-electric device electrically connected to said first device, a field winding for said second device, means for varying the flow of current through said field winding in a plurality of steps to effect changes in the speed of said first dynamo-electric device, additional means disposed to be responsive to a variable operating characteristic of said first dynamo-electric device for varying the flow of current through said field winding independently of said first-named means to maintain the speed of said first dynamo-electric device at predetermined different speeds, each speed corresponding to a step of said first-named means, and means responsive to the current flowing through said field winding for opposing the functioning of said additional means in responding to the variable operating characteristic of said first dynamo-electric device.

17. In a Ward-Leonard control system, in combination, a first dynamo-electric device operatively connected to a load, a second dynamo-electric device electrically connected to said first device, a field winding for said second device, circuit means for variably connecting said field winding to a source of control current, balanced circuit means connected to said circuit means, and a regulator-generator connected to be responsive to a variable operating characteristic of said first dynamo-electric device and interconnected in said balanced circuit means for varying the current flowing through said field winding independently of said variably connected circuit means.

18. In a Ward-Leonard control system, in combination, a first dynamo-electric device operatively connected to a load, a second dynamo-electric device electrically connected to said first device, a field winding for said second device, circuit means for variably connecting said field winding to a source of control current, balanced circuit means connected to said circuit means, a regulator-generator connected to be responsive to a variable operating characteristic of said first dynamo-electric device and interconnected in said balanced circuit means for varying the current flowing through said field winding independently of said variably connected circuit means, and means responsive to the current flowing through said field winding for proportionately opposing the functioning of said regulator-generator in response to said variable operating characteristic.

19. In a Ward-Leonard control system, in combination, a first dynamo-electric device operatively connected to a load, a second dynamo-electric device electrically connected to said first device, a main field winding for said second device, a balanced Wheatstone bridge circuit including said main field winding in one of its branches, means for connecting one control source between one pair of opposite terminals of said bridge circuit, means for connecting another control source comprising the armature of a generator between the remaining pair of terminals of said bridge circuit, and means for controlling the voltage generated by said armature in accordance with a variable operating characteristic of said first dynamo-electric device.

20. In a Ward-Leonard control system, in combination, a first dynamo-electric device operatively connected to a load, a second dynamo-electric device electrically connected to said first device, a main field winding for said second device, a balanced Wheatstone bridge circuit including said main field winding in one of its branches, a controller for connecting one pair of opposite terminals of said bridge circuit to a control source in a plurality of steps, and a regulator-generator for controlling the flow of current through said main field winding independently of said control source to maintain the speed of said first dynamo-electric device at predetermined different speeds, each speed corresponding to a step of said controller, said regulator-generator comprising an armature connected across the remaining pair of opposite terminals of said bridge circuit, and series and shunt field windings differentially connected to be respectively responsive to the current and voltage applied to said first dynamo-electric device.

21. In a Ward-Leonard control system, in combination, a first dynamo-electric device operatively connected to a load, a second dynamo-electric device electrically connected to said first device, a main field winding for said second device, a balanced Wheatstone bridge circuit including said main field winding in one of its branches, a controller for connecting one pair of opposite terminals of said bridge circuit to a control source in a plurality of steps, and a regulator-generator for controlling the flow of current through said main field winding independently of said control source to maintain the speed of said first dynamo-electric device at predetermined different speeds, each speed corresponding to a step of said controller, said regulator-generator comprising an armature connected across the remaining pair of opposite terminals of said bridge circuit, and series, shunt and differential field windings, said series and shunt field windings being differentially connected to be respectively responsive to the current and voltage applied to said first dynamo-electric device, and said differential field winding being connected in series circuit relation with said main field winding and differentially related to said shunt field winding.

22. In a Ward-Leonard control system, in combination, a first dynamo-electric device operatively connected to a load, a second dynamo-electric device electrically connected to said first device, a main field winding for said second device, a controller for connecting said main field winding to a control source in a plurality of different steps to effect changes in the speed of said first dynamo-electric device, and a regulator-generator connected to vary the flow of current through said main field winding independently of the current flow therethrough from said control source to maintain the speed of said first dynamo-electric device at predetermined different speeds, each speed corresponding to a step of said controller, said regulator-generator having an armature, a series field winding, a shunt field winding, and a differential field winding, said series and shunt field windings being connected to be differentially related and respectively responsive to the current and voltage applied to said first dynamo-electric device, said armature being connected across one pair of the opposite terminals of a balanced Wheatstone bridge circuit, the remaining pair of terminals of said bridge circuit being connected through said controller to said control source, one of the arms of said bridge circuit including said main field winding and said differential field winding in serial connection, said differential field winding being disposed to oppose the combined effect of said series and shunt field windings.

DANILO SANTINI.
KENNETH M. WHITE.